3,028,319
MANUFACTURE OF MAGNESIUM ORGANO COMPOUNDS

Paul Kobetz and Richard C. Pinkerton, Baton Rouge, La., assignors to Ethyl Corporation, New York, N.Y., a corporation of Delaware
No Drawing. Filed Feb. 1, 1960, Ser. No. 5,671
4 Claims. (Cl. 204—59)

This invention relates to the manufacture of organo compounds of magnesium, and more particularly to the manufacture of magnesium dialkyl compounds, as such, or in admixture or as complexes with certain other metal hydrocarbon components.

Halogen-free magnesium dihydrocarbon compounds are recognized as useful materials for various purposes, including, for example, in organic syntheses generally, as components of polymerization catalysts for the polymerization of olefins such as ethylene, and as reagents for the reaction with various inorganic metal compounds to generate other metal hydrocarbon materials. An example of this latter reaction is the reaction of a magnesium ethyl compound with a lead salt of an inorganic or an organic acid, to make tetraethyllead.

Heretofore, preparation of magnesium dihydrocarbon compounds have been solely laboratory scale syntheses, suitable only for making these materials in reagent quantities, and unsuited for industrial production. Examples of the procedures heretofore employed include the precipitation of a magnesium dialkyl from an ethereal solution of a Grignard reagent by the addition of dioxane, or by the reaction of ethyl sodium with magnesium metal in the presence of mercury, or also by the reaction of magnesium metal with a mercury dialkyl. It will be apparent that these procedures are unsuited for commercial production.

An object of the present invention, then, is to provide a feasible and effective process for the magnesium dihydrocarbon containing compounds. A more specific object is to provide an effective process for making magnesium dihydrocarbon compounds free of ether solvent. An additional object of the invention is to provide an efficient electrolytic process for the generation of magnesium dihydrocarbon compounds, especially magnesium dialkyls, in the form of complexes with aluminum trihydrocarbon or aluminum trialkyl compounds. Other objects will appear hereinafter.

The foregoing and additional objects of the invention are provided by passing an electric current through an electrolyte, as hereinafter defined, and a magnesium anode. The electrolyte contains an alkali metal aluminum methyl compound, especially an alkali metal aluminum tetraalkyl in which at least one of the alkyl groups is a methyl group. The electrolysis forms a magnesium dihydrocarbon material, such as a magnesium dialkyl admixed with an aluminum trialkyl which is jointly released in the process. Another variant of the electrolyte compositions employed in the process of the invention is a mixture of alkali metal aluminum tetramethyl compound plus an alkali metal aluminum tetraalkyl or tetraaryl, the organo groups of this latter component containing from 2 to about 12 carbon atoms.

More specifically, then, in carrying out the process, an electrolyzing current from a magnesium anode is passed through an electrolyte comprising an alkali metal aluminum tetraorgano compound having the formula $$MAl(CH_3)_xR_{4-x}$$

wherein M is an alkali metal, R is selected from the group consisting of alkyl and aryl groups, each group containing from 2 to 12 carbon atoms, and $x$ is an integer of from 1–4 inclusive. An especially preferred embodiment of this invention relates to the manufacture of a magnesium ethyl product, using a mixed complex having, in addition to the alkali metal aluminum methyl compound, another alkali metal aluminum compound in which all of the organo groups contain from 2 to 12 carbon atoms. An especially preferred electrolyte contains more than one alkali metal, e.g. both sodium and potassium or sodium and lithium or all three metals.

The electrolyte mixture usually contains from 5–95 percent of the alkali metal aluminum methyl compound. Best results are obtained using a concentration of the alkali metal aluminum methyl compound of from 10–75 mole percent. A preferred concentration of the alkali metal aluminum methyl compound in the electrolyte mixture is from about 20–65 mole percent. In general the electrolyte composition should have a melting point below about 150° C., for ease in operation and attaining operating temperatures. Electrolytic systems having melting points above 150° C. are operable, but inconvenient, since such systems dictate a more narrow permissible range of operating temperatures.

In embodiments of the process in which an alkali metal aluminum tetramethyl is admixed with another alkali metal tetrahydrocarbon, it is found that the former component contributes disproportionately to the efficiency of the electrolyte system with respect to low melting point and electrical conductivity. Thus, although sodium aluminum tetramethyl has a melting point of over 250° C., when mixed with sodium aluminum tetraethyl at only a 25 mole percent concentration, an electrolyte melting at about 80° C. is provided. Further, the electrical conductivity of such a system, liquid, is greater than the conductivity of either component.

The process involves exceptionally simple techniques and apparatus and provides high yields of magnesium organo compounds. The process, in effect, provides a route for such synthesis directly from magnesium metal, hydrogen, and an olefin. The magnesium metal is converted at the anode to a magnesium diorgano product and the electrolyte can be regenerated, either periodically or continuously, by reaction with an olefin and hydrogen. The process is capable of extremely high production capacities because it can be operated at high current densities, and this is practical because of the very high conductivity of the complex electrolyte. The process can be conducted at these high current densities at temperatures well below the thermal decomposition temperature of the magnesium diorgano product or a complex thereof with an aluminum triorgano compound. This good conductivity also materially reduces the problem of thermal balance for the cell. One feature of this invention is that the anode product contains a smaller proportion than expected of methyl groups when the electrolyte also contains other hydrocarbon radicals, having two or more carbon atoms, in addition to the methyl groups.

As already indicated, the magnesium diorgano compound which is formed at the anode is combined with the jointly released aluminum trihydrocarbon material, forming a homogeneous, low melting material which is a complex of the magnesium and aluminum components. Such materials are readily withdrawn as liquids for use as such, or for resolution to the magnesium and aluminum compounds and recycling of the latter as described herein.

The reaction of the present process can be illustrated generally as follows:

$$2MAlR_4 + Mg \rightarrow 2M + 2AlR_3 + MgR_2$$

wherein M is an alkali metal and R represents hydrocarbon groups. As previously stated, the aluminum trialkyl is withdrawn as a complex with the magnesium product. In the general expression above, then, the aluminum and magnesium components can be considered as a material having the composition $MgR_2 \cdot 2AlR_3$. To resolve this composition, distillation of the material under vacuum results in separation of the aluminum portion as an overhead vapor, and releases magnesium dihydrocarbon products as crystalline solid products. When this separation is performed, the aluminum compounds can be reconverted to a complex component, for return to the electrolysis operation, in accordance with the following equation:

$$AlR_3 + MBR_4 \rightarrow MAlR_4 + BR_3$$

or $$AlR_2Me + MBR_4 \rightarrow MAlR_3Me + BR_3$$

The complex can then be regenerated by the following equations:

$$BR_3 + MH \rightarrow MBR_3H$$
$$MBR_3H + olefin \rightarrow MBR_4$$

As discussed above, it is convenient to carry out the electrolysis of this invention using an electrolyte containing both an alkali metal aluminum tetramethyl and an alkali metal aluminum tetraalkyl in which the alkyl contains at least 2 carbon atoms. It is to be recognized that the electrolyte can contain two or more methyl-containing compounds, such as sodium aluminum methyl triethyl, sodium aluminum dimethyl diethyl and sodium aluminum trimethylethyl, and especially mixed compounds of two or more alkali metals.

The present process can be carried out over an exceedingly wide temperature range, generally from 0 to about 200° C. The upper temperature at the anode is, however, limited by the decomposition temperature of the magnesium dihydrocarbon compound. Accordingly, when forming magnesium diethyl, for example, it is usually desirable to maintain the temperature below about 150° C., and preferably in the range of about 100 to 125° C. When using sodium compounds as the electrolyte the cathode region temperature is best maintained above about 100° C. so as to remove the sodium in a liquid state. With potassium or sodium-potassium alloys lower temperatures can be used.

In some instances, it is desirable to circulate, particularly adjacent the anode zone, a liquid exhibiting solvency for the magnesium organo product realized by the electrolysis. Although the magnesium dihydrocarbon compounds as such are insoluble in hydrocarbon liquids, the complexes which are formed as already described, by the operations, are at least partly soluble in hydrocarbon liquids. Hence, cycling stable materials such as xylenes, toluene, or high boiling aliphatic liquids, is occasionally desirable, but is normally unnecessary, as the anodic products are liquids at quite low temperatures. A preferred mode of using these liquids involves feeding them adjacent the anode zone, and withdrawing the liquid along with the cell product before extensive opportunity for the liquid to become dispersed in the electrolyte proper. Operations which employ such liquid media for the anodic product are the exception, because the complexes of magnesium and aluminum hydrocarbons are, normally, low melting solids, or liquids at operating conditions.

Normally, the electrolysis is conducted at or near atmospheric pressure. However, a pressure of inert gas such as nitrogen can be employed when desired, especially to assure an oxygen and moisture-free system.

The following are typical examples of the process of this invention, all parts being given in parts by weight.

*Example I*

An aquimolal mixture of sodium aluminum tetramethyl and sodium aluminum tetraethyl was provided to an electrolysis cell. The cell was provided with a cylindrical steel cathode and a magnesium anode in the form of a smooth rod of cylindrical cross section, positioned concentrically with the cathode. The cell and contents were heated to a temperature of about 100° C., the electrolyte being fully liquid under such conditions. Current was passed through the system at a voltage of 7.4 volts and with a current density of 0.25 amp. per sq. cm., based upon the anode surface.

Electrolysis immediately occurred, and was accompanied by release of a colorless liquid product floating on the electrolyte adjacent the anode, which was readily withdrawn. Concurrently, metallic, liquid sodium metal was released at the cathode, and was similarly recoverable. A current efficiency of 95 percent was obtained.

Analysis of the anode product showed that it had the composition $MgR_2 \cdot 2AlR_3$, where R represented methyl and ethyl radicals, the ethyl groups being over 130 percent as numerous as the methyl groups. This illustrates the enrichment or selectivity of the process, in that the ethyl groups released in the anode product are significantly higher in proportion than provided in the electrolyte.

The anode product is subjected to vacuum fractionation at about 300 mm. Hg pressure, aluminum trialkyl being taken off overhead until a magnesium dialkyl product is released as white, subdivided solids. The magnesium dialkyl solids contain magnesium diethyl, some magnesium ethyl methyl, and some magnesium dimethyl.

*Example II*

The procedure of Example I was repeated, except that the anode in this instance was a coiled ribbon. The current efficiency in this instance was somewhat lower, at about 72 percent.

In regenerating the electrolyte component removed by the electrolysis in these operations, the aluminum trialkyl, separated from the magnesium dialkyl, is then reacted with sodium boron tetraethyl, releasing boron triethyl vapor, and forming the corresponding sodium aluminum tetraalkyl which is then recirculated to the electrolysis zone as make-up electrolyte component. Alternatively, the aluminum trialkyls were prepared for recirculation and re-use by mixing with sodium hydride in the proportions of about one mole per mole of the aluminum trialkyl, and then treating the so-formed complex with ethylene at elevated pressure. This operation regenerates sodium aluminum tetraethyl which is then recirculated to the electrolyte bath. Addition of some sodium aluminum tetramethyl is also sporadically required.

The alkali metal hydride employed in the aluminum alkyl recovery operation is conveniently provided by pressure hydriding of the alkali metal produced by the electrolysis operation, after removal from the electrolysis zone.

*Example III*

Example I above, is repeated, except that in this instance the composition of the electrolyte is altered to provide the corresponding potassium aluminum tetraalkyl components for one-fourth of the electrolyte complex compounds. Using this electrolyte system, the voltage necessary for the desired current density is somewhat decreased, and in addition, the cathode product is a lower melting liquid mixture of potassium and sodium metals.

In the recovery and recycling operation for this type of an operation, the alkali metal with which the aluminum trialkyl is incorporated, to produce the recycled alkali metal aluminum metal tetraalkyl complex, is in the same proportions as the components of the cathode product, with respect to potassium and sodium, to preserve a substantially uniform composition of the electrolyte system.

*Example IV*

Example I is again repeated, except that in this instance the ratio of the respective alkali metal aluminum tetraalkyl components is changed to provide only one mole of sodium aluminum tetramethyl per three moles of sodium aluminum tetraethyl. Comparable results are provided, except that a somewhat higher operating voltage is desirable. In addition, the ethyl groups, in the magnesium dialkyl·aluminum dialkyl anodic product, approaches 90 percent.

Example V

In this operation, the electrolyte comprises potassium aluminum tetramethyl and potassium aluminum tetra-n-propyl, in the molal ratio of 1:8. A temperature of operation of about 150° C. is applied, and the anode complex product is realized with satisfactory current density and anode efficiency, the final magnesium dialkyl product comprising magnesium di-n-propyl.

Example VI

The electrolyte in this case is 2 moles of sodium aluminum tetramethyl to 3 moles of sodium aluminum tetraphenyl, the electrolysis being at the relatively elevated temperature of 175° C. An anode product comprising $MgR_2 \cdot 2AlR_3$ is provided, the R radicals being methyl and phenyl. Subsequent recovery and purification operations are as previously described.

Example VII

In this operation mixed alkali metal components are provided, the electrolyte being lithium aluminum tetramethyl and sodium aluminum tetra-n-butyl, in the proportions of 1:3 moles respectively. The anode product is a mixture of magnesium dialkyl and aluminum trialkyl, the alkyl groups including n-butyl and some methyl radicals. The cathode product is a mixture of sodium and lithium metals.

As previously mentioned, the present invention is adapted to directing the type hydrocarbon radicals affixed to the magnesium diorgano product, as is illustrated by the following example showing preparation of a magnesium methyl compound.

Example VIII

The general procedure of Example II is again followed, except that in this instance the electrolyte is a mixture of rubidium aluminum tetramethyl and sodium aluminum tetramethyl, in the proportions of about 1:5 moles, respectively. An operating temperature of 140° C. is provided, and production of the complex magnesium dimethyl·aluminum trimethyl is achieved.

Example IX

In this operation the procedure of Example VIII above is repeated, except that several weight percent of the electrolyte mixture is an added stable ether comprising the dimethyl ether of diethylene glycol. This permits operation at appreciably lower temperatures than in Example VIII.

The alkali metal aluminum methyl compounds of the electrolyte can be prepared in several ways. A convenient process involves the displacement reaction of the elemental alkali metal with aluminum trimethyl forming the corresponding alkali metal tetramethyl. These compounds can also be prepared by the addition reaction of aluminum trimethyl and alkali metal alkyl compounds, or contrary-wise, aluminum trialkyls with sodium methyl. A particularly suitable method for the mixed alkyl compounds is the reaction of an olefin, e.g. ethylene with an alkali metal aluminum alkyl hydride. Likewise, the complex methyl compound can be made by reaction of an alkyl halide with an alkali metal and trimethyl aluminum.

The alkali metal aluminum tetraorgano compound (the organo group containing 2 or more carbon atoms) can be made by analogous processes. That is, the alkali metal can be reacted directly with the aluminum triorgano compound, e.g. sodium reacts with triethyl aluminum to form sodium aluminum tetraethyl and metallic aluminum. Likewise, sodium ethyl and other alkali metal organo compounds will react directly with the aluminum triorgano compound to form the complex as an addition product. The corresponding organo halides will also react with the alkali metal and aluminum triorgano compound to form the complex, for example, sodium reacts with ethyl chloride and aluminum triethyl to form sodium aluminum tetraethyl. A particularly desirable method of preparing the alkyl complexes is the processes discussed above with reference to regeneration of the trialkyl aluminum electrolyte. Aluminum trialkyls, e.g. aluminum trimethyl or aluminum triethyl, will react with an alkali metal hydride such as sodium hydride to form the corresponding complex hydride, e.g. sodium aluminum triethyl hydride, which can thereafter be reacted with a suitable olefin, as discussed above, forming sodium aluminum tetraethyl. All of the above preparation reactions can be carried out at temperatures from about 0° C. to about 150° C.

Normally, liquid additives are avoided in the electrolysis system of a process, since they tend to reduce markedly the conductivity of the electrolyte. However, the employment of minor quantities—say of the order of 1–5 weight percent—of stable aromatic hydrocarbons added to the electrolyte is not precluded. Similarly, minor quantities of ethers, for example, the glycol ethers such as ethylene glycol dialkyl ethers, and other polyglycol ethers is occasionally permissible.

We claim:

1. A process for the manufacture of a magnesium complex compound of the formula $MgR_2 \cdot 2AlR_3$, wherein R includes the same and different hydrocarbon radicals, the hydrocarbon radicals thereof predominating in radicals of at least 2 carbon atoms, comprising passing an electric current through an electrolyte and a magnesium containing anode, said electrolyte consisting essentially of alkali metal aluminum tetrahydrocarbon, the hydrocarbon radicals in said electrolyte including from 5 to 95 percent methyl groups.

2. A process for the manufacture of a magnesium complex compound of the formula $MgR_2 \cdot 2AlR_3$, wherein R is an alkyl radical, and the said radicals predominate in radicals having at least two carbon atoms, comprising forming an electrolyte of alkali metal aluminum tetramethyl and an alkali metal aluminum tetraalkyl, wherein each alkyl group has from 2 to 12 carbon atoms, the alkali metal aluminum tetramethyl being in proportions from about 5 to 95 mole percent, and charging to an electrolysis zone and electrolyzing by passing an electric current therethrough and through a magnesium anode in contact therewith and forming thereby said magnesium complex compound, and removing said complex compound from the electrolysis zone.

3. A process for the manufacture of an organo magnesium product having the composition $MgR_2 \cdot 2AlR_3$, wherein R is an alkyl radical from the group consisting of methyl and ethyl radicals, the ethyl radicals being in excess of the methyl radicals, said process comprising passing an electric current through an electrolyte in an electrolysis zone, the electrolyte consisting essentially of an approximately equimolar mixture of sodium aluminum tetramethyl and sodium aluminum tetraethyl, and a magnesium anode in contact therewith, the electrolyte being maintained at a temperature of about 100° C. and the current density being about 0.25 ampere per square centimeter, and withdrawing the said organo-magnesium product from the electrolysis zone.

4. The process of claim 2 wherein the alkali metals of the electrolyte compounds are different.

References Cited in the file of this patent
UNITED STATES PATENTS 2,849,349    Ziegler et al. _____ Aug. 26, 1958

FOREIGN PATENTS 214,834    Australia _____ Apr. 24, 1958